United States Patent
Liang et al.

(10) Patent No.: US 7,848,089 B2
(45) Date of Patent: Dec. 7, 2010

(54) KEYBOARD ASSEMBLY

(75) Inventors: An-Gang Liang, Shenzhen (CN);
Zheng-Heng Sun, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 222 days.

(21) Appl. No.: 12/261,024

(22) Filed: Oct. 29, 2008

(65) Prior Publication Data

US 2010/0073855 A1    Mar. 25, 2010

(30) Foreign Application Priority Data

Sep. 25, 2008  (CN) .................. 2008 1 0304663

(51) Int. Cl.
*G06F 1/16* (2006.01)
(52) U.S. Cl. ............. 361/679.08; 400/472; 710/64
(58) Field of Classification Search ........... 361/679.08; 710/64; 400/472, 691, 479
See application file for complete search history.

(56) References Cited

U.S. PATENT DOCUMENTS

| 4,788,658 | A | * | 11/1988 | Hanebuth | 361/679.41 |
|---|---|---|---|---|---|
| 5,400,055 | A | * | 3/1995 | Ma et al. | 345/168 |
| 5,841,424 | A | * | 11/1998 | Kikinis | 345/168 |
| 6,040,977 | A | * | 3/2000 | Hoffer | 361/679.55 |
| 6,104,604 | A | * | 8/2000 | Anderson et al. | 361/679.55 |
| 6,290,517 | B1 | * | 9/2001 | Anderson | 439/131 |
| 6,424,522 | B1 | * | 7/2002 | Lin et al. | 361/679.4 |
| 6,449,142 | B1 | * | 9/2002 | Wu | 361/679.08 |
| 6,545,668 | B1 | * | 4/2003 | Hayama | 345/172 |
| 6,902,332 | B2 | * | 6/2005 | McLoone | 400/472 |
| 6,972,945 | B1 | * | 12/2005 | Kozak et al. | 361/679.08 |
| 7,113,394 | B2 | * | 9/2006 | Liang | 361/679.08 |
| 7,217,144 | B1 | * | 5/2007 | Cipolla et al. | 439/131 |
| 7,227,742 | B2 | * | 6/2007 | Hill et al. | 361/679.08 |
| 7,433,177 | B2 | * | 10/2008 | Tsao et al. | 361/679.09 |
| 7,483,262 | B2 | * | 1/2009 | Yin et al. | 361/679.01 |
| 2002/0097552 | A1 | * | 7/2002 | Wu | 361/680 |
| 2007/0041771 | A1 | * | 2/2007 | Choo et al. | 400/472 |
| 2008/0133803 | A1 | * | 6/2008 | Liu et al. | 710/64 |

FOREIGN PATENT DOCUMENTS

GB         2154948 A   *  9/1985

* cited by examiner

*Primary Examiner*—Lisa Lea-Edmonds
(74) *Attorney, Agent, or Firm*—Zhigang Ma

(57) ABSTRACT

A keyboard assembly includes a main keyboard and a numeric keyboard. The main keyboard includes a first connector formed on a first end surface and a second connector formed on a second end surface. The numeric keyboard includes a third connector formed on a first side surface and a fourth connector form on a second side surface. When the numeric keyboard is located at the first end surface of the main keyboard, the fourth connector is connected to the first connector. When the numeric keyboard is located at the second end surface of the main keyboard, the third connector is connector is connected to the second connector.

17 Claims, 4 Drawing Sheets

KEYBOARD ASSEMBLY

BACKGROUND

1. Technical Field

The present disclosure relates to input equipment for person computers and, more particularly, to a keyboard assembly.

2. Description of the Related Art

Keyboards are standard peripheral equipment for personal computers. A keyboard usually includes a main keyboard and a numeric keyboard which is normally located at the right side of the main keyboard. Unfortunately, when a user needs to operate the numeric keyboard via a left hand and a mouse via a right hand at the same time, the location of the numeric keyboard is not convenient.

Therefore, what is needed, is a keyboard assembly which can solve the above problem.

DETAILED DESCRIPTION

Figure 1:
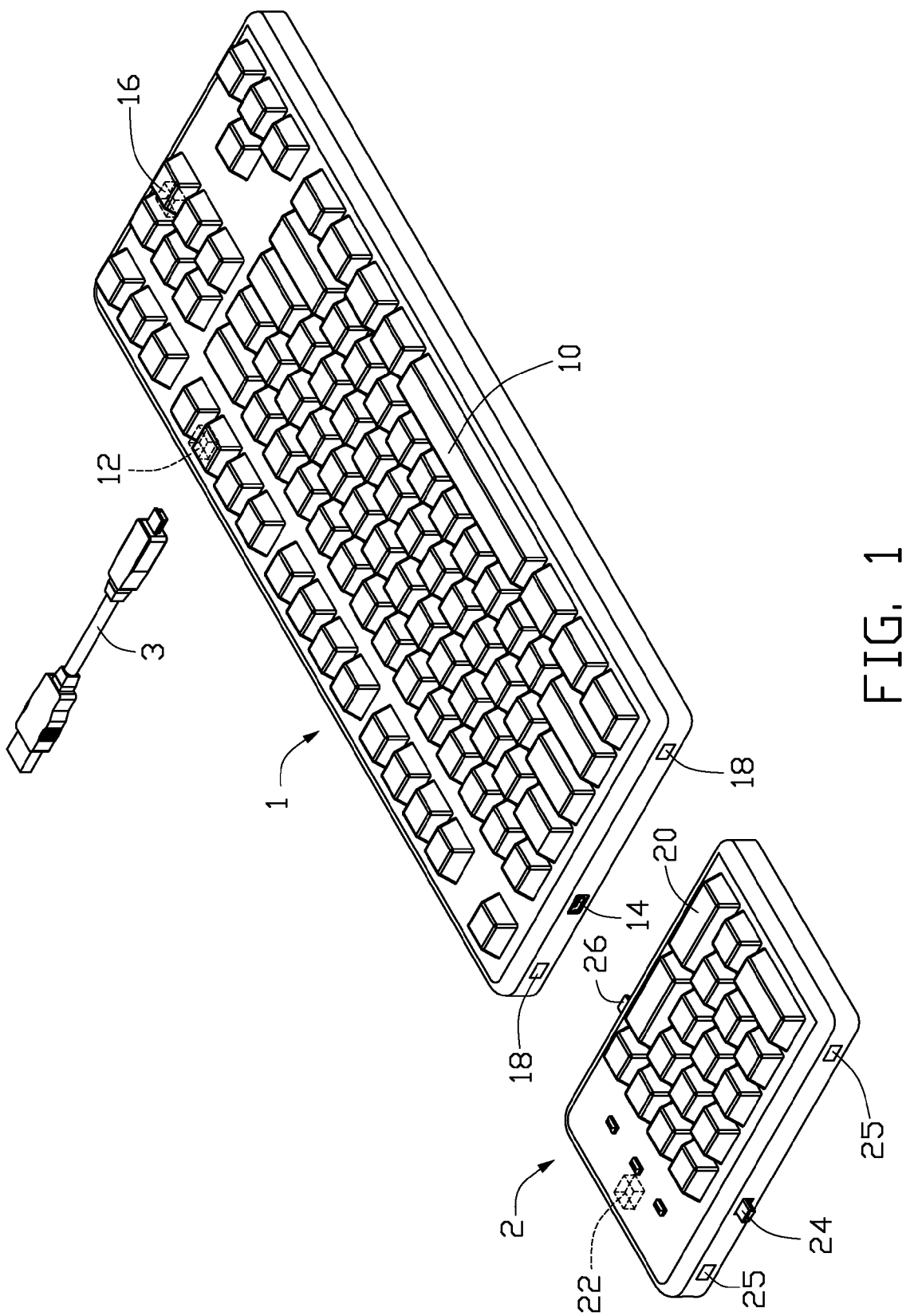
FIG. 1 is an exploded, isometric view of an embodiment of a keyboard assembly, the keyboard assembly including a numeric keyboard.
Figure 2:
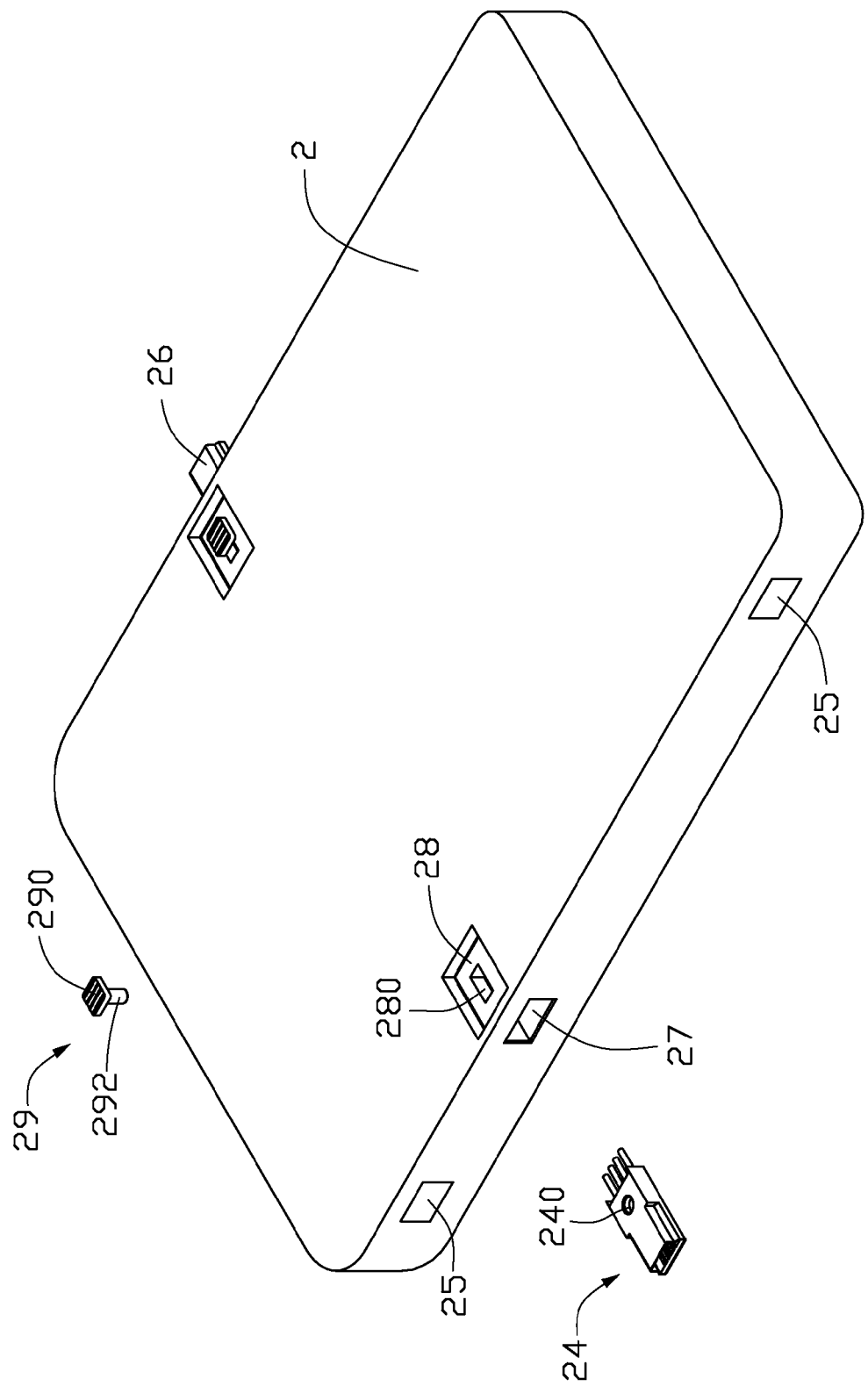
FIG. 2 is an exploded, inverted view of the numeric keyboard of FIG. 1.

Referring to FIGS. 1 and 2, a keyboard assembly includes a main keyboard 1, a numeric keyboard 2, and a connection line 3.

The main keyboard 1 includes a plurality of keys 10 and three connectors 12, 14, and 16. The connectors 14 and 16 are formed on two opposite end surfaces of the main keyboard 1. The connector 12 is formed on a backside of the main keyboard 1. In one embodiment, the connectors 12, 14, and 16 are female connectors.

The numeric keyboard 2 includes a plurality of keys 20, three connectors 22, 24, 26, and two operation members 29. The connectors 24 and 26 are formed on two opposite side surfaces of the numeric keyboard 2. The connector 22 is formed on a back end of the numeric keyboard 2. In one embodiment, the connector 22 is a female connector, and the connectors 24 and 26 are male connectors. Two receiving holes 27 are defined in the two side surfaces of the numeric keyboard 2 to receive the connectors 24 and 26. The connectors 24 and 26 each define a fixing hole 240. The numeric keyboard 2 also defines two depressed portions 28 in a bottom of the numeric keyboard 2 corresponding to the receiving holes 27 respectively, and two sliding grooves 280 in bottoms of the depressed portions 28. The two sliding grooves 280 are communicating with the corresponding receiving holes 27.

Each operation member 29 includes an operation portion 290 and a connecting post 292 perpendicularly extending from the operation portion 290. The operation portion 290 is received in the depressed portion 28. The connecting post 292 is passed through one of the two corresponding sliding grooves 280, and fixed in the fixing hole 240 of one of the connectors 24 and 26. The diameter of the connecting post 292 is a little smaller than the width of the sliding groove 280. The connecting post 292 can be slid in the sliding groove 280, resulting in the corresponding one of the connectors 24 and 26 moving out of or retracting back into the corresponding receiving hole 27. A plurality of raised lines are formed on a surface of the operation portion 290 to allow operating the operation portion 290 with a firm contact.

Figure 3:
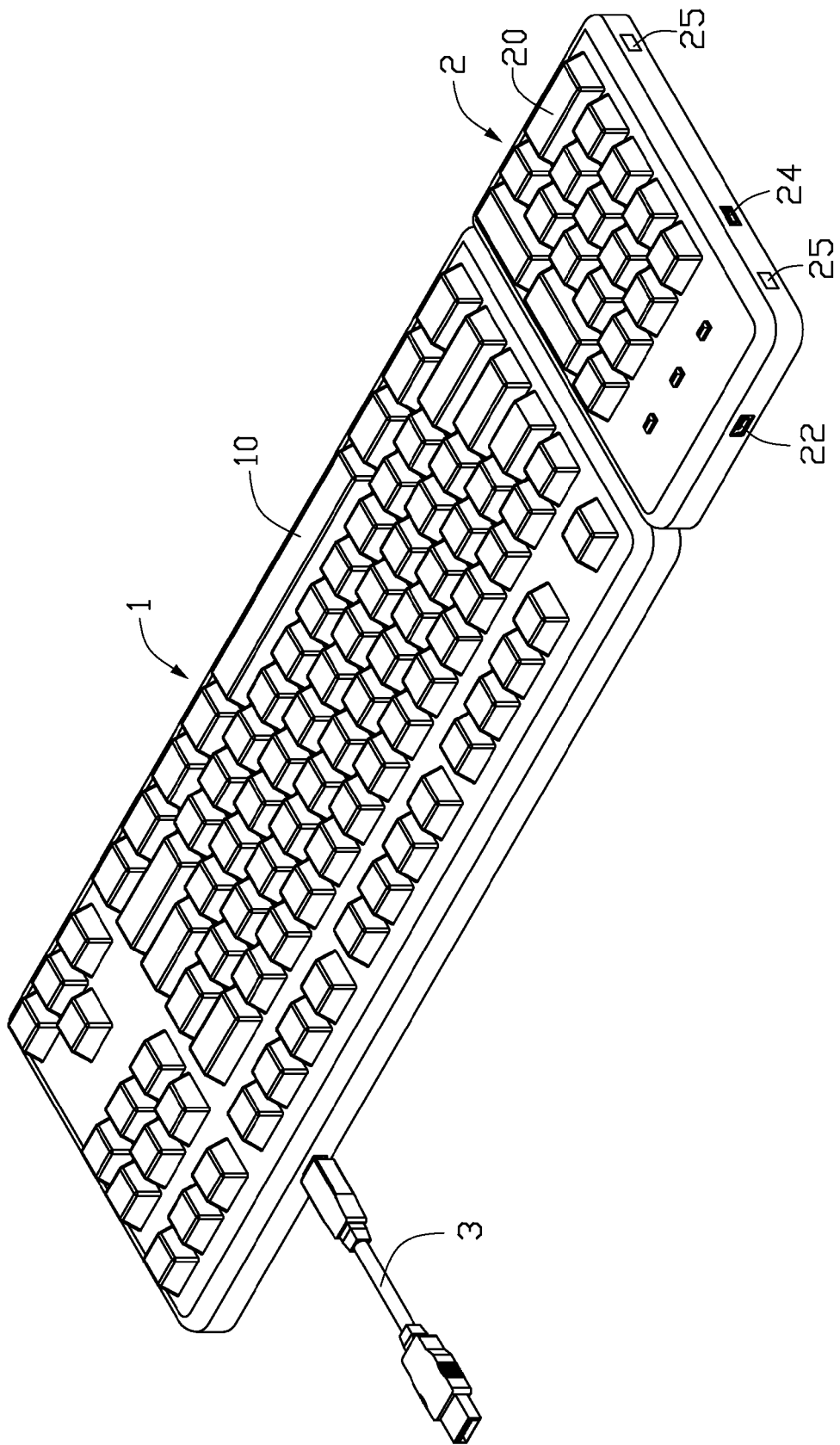
FIG. 3 is an assembled, isometric view of FIG. 1, but viewed from another perspective.

Referring to FIG. 3, if the numeric keyboard 2 needs to be operated with right hand, the connector 24 is moved out of the receiving hole 27 via operating the operation portion 290 so as to connect to the connector 16 of the main keyboard 1. Moreover, the connector 12 of the main keyboard 1 is connected to an electronic device (not shown) via the connection line 3.

Figure 4:
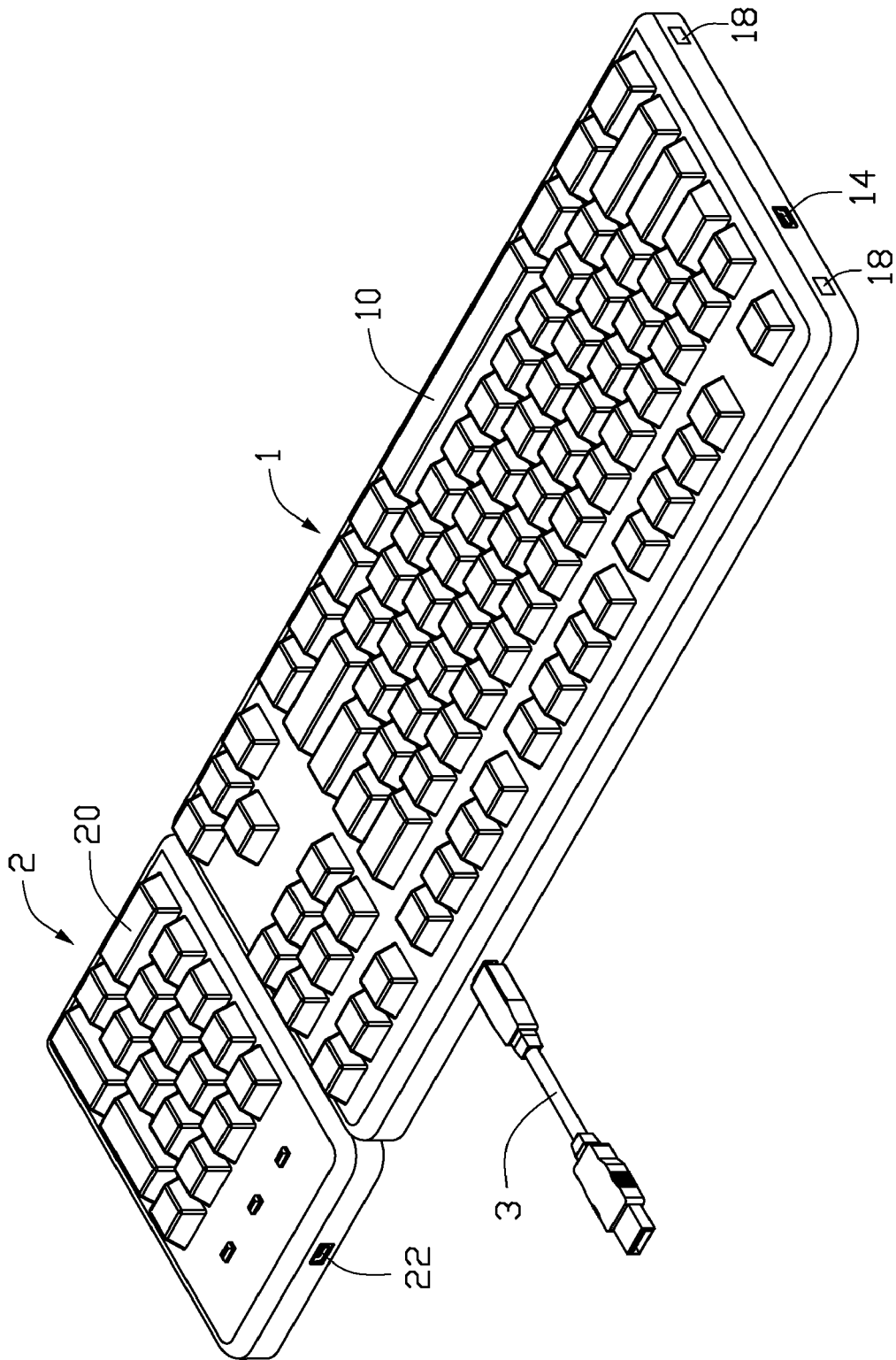
FIG. 4 is similar to FIG. 3, but showing the numeric keyboard being located at a different position.

Referring to FIG. 4, if the numeric keyboard 2 needs to be operated with left hand and a mouse (not shown) needs to be operated with right hand at the same time, the connector 26 is moved out of the receiving hole 27 via operating the operation portion 290 so as to connect to the connector 14 of the main keyboard 1. Moreover, the connector 12 of the main keyboard 1 is connected to the electronic device via the connection line 3.

Four first magnets 18 are positioned at end surfaces of the main keyboard 1. Moreover, four second magnets 25 having opposite polarities to the first magnets 18 are positioned at side surfaces of the numeric keyboard 2, to come in magnetic communication with the first magnets 18 when the numeric keyboard 2 is connected to the main keyboard 1.

For this keyboard assembly, the connector 12 can connect to the electronic device via the connection line 3 to solely operate the main keyboard 1. In this way, the main keyboard 1 can save working spaces. Furthermore, the connector 22 of the numeric keyboard 2 can connect to the electronic device via the connection line 3 to solely operate the numeric keyboard 2.

In the illustrated embodiment, all the connectors are universal serial bus (USB) connectors. The connection line 3 is a USB connection line. In other embodiments, a first end of the connection line 3 may be connected to a control circuit (not shown) inside the main keyboard 1 or the numeric keyboard 2, and a second end of the connection line 3 may be connected to the electronic device via a PS/2 connector. Furthermore, the connectors 14 and 16 are male connectors, meanwhile the connectors 24 and 26 are female connectors.

The foregoing description of the various inventive embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the disclosure and their practical application so as to enable others of ordinary skill in the art to utilize the disclosure and various embodiments and with various modifications as are suited to the particular use contemplated. Alternately embodiments will become apparent to those of ordinary skill in the art to which the present disclosure pertains without departing from its spirit and scope. Accordingly, the scope of the present disclosure is defined by the appended claims rather than the foregoing description and the various inventive embodiments described therein.

What is claimed is:

1. A keyboard assembly comprising
    a main keyboard with a first connector formed on a first end surface and a second connector formed on a second end surface;
    a numeric keyboard with a third connector formed on a first side surface, a fourth connector formed on a second side surface, and a fifth connector; wherein the fourth connector is connected to the first connector when the numeric keyboard is located at the first end surface of the main keyboard, and the third connector is connected to the second connector when the numeric keyboard is located at the second end surface of the main keyboard; and a connection line, wherein the connection line is configured to be connected to the numeric keyboard by the fifth connector.

2. The keyboard assembly of claim 1, wherein the main keyboard further comprises a sixth connector, the connection line is further configured to be connected to the main keyboard by the sixth connector.

3. The keyboard assembly of claim 1, wherein the first and second connectors are female universal serial bus (USB) connectors, and the third and fourth connectors are male USB connectors.

4. The keyboard assembly of claim 3, wherein the numeric keyboard defines two receiving holes in the two side surfaces for receiving the corresponding third and fourth connectors, two depressed portions are defined in a bottom of the numeric keyboard corresponding to the receiving holes, a sliding grooves is defined in the bottom of each of the depressed portions and communicates with the corresponding receiving hole; wherein the numeric keyboard further comprises two operation members, each operation member comprises an operation portion and a connecting post extending from the operation portion; wherein the connecting post is passed through a corresponding sliding groove and fixed to one of the third or fourth connectors.

5. The keyboard assembly of claim 4, wherein a plurality of raised lines are formed on a surface of each operation portion of operation member.

6. The keyboard assembly of claim 4, wherein each of the third or fourth connectors defines a fixing hole to fix the connecting post of the corresponding operation member.

7. The keyboard assembly of claim 1, wherein the first and second connectors are male universal serial bus (USB) connectors, and the third and fourth connectors are female USB connectors.

8. The keyboard assembly of claim 7, wherein the main keyboard defines two receiving holes in the two end surfaces thereof for receiving the corresponding first and second connectors, two depressed portions are defined in a bottom of the main keyboard corresponding to the receiving holes, a sliding groove is defined in the bottom of each of the depressed portions and communicates with the corresponding receiving hole; wherein the main keyboard further comprises two operation members, each operation member comprises an operation portion and a connecting post extending from the operation portion; wherein the connecting post is passed through a corresponding sliding groove and fixed to one of the first or second connectors.

9. The keyboard assembly of claim 8, wherein a plurality of raised lines are formed on a surface of each operation portion.

10. The keyboard assembly of claim 8, wherein each of the first or second connectors defines a fixing hole to fix a corresponding connecting post of the corresponding operation member.

11. The keyboard assembly of claim 1, wherein the main keyboard further comprises a plurality of first magnets positioned at end surfaces; wherein the numeric keyboard further comprises a plurality of second magnets having opposite polarities to the first magnets positioned at side surfaces, at least one of the plurality of first magnets is able to come in magnetic communication at least one of the plurality of second magnets upon the condition that the numeric keyboard is connected to the main keyboard via corresponding connectors.

12. A computer system that comprises a motherboard with a central processing unit, comprising: a connection line; a keyboard assembly, connected to the motherboard via the connection line, comprising: a main keyboard with a first connector formed on a first end surface and a second connector formed on a second end surface; and a numeric keyboard with a third connector formed on a first side surface, a fourth connector formed on a second side surface, and a fifth connector; wherein the fourth connector is connected to the first connector when the numeric keyboard is located at the first end surface of the main keyboard, and the third connector is connected to the second connector when the numeric keyboard is located at the second end surface of the main keyboard, and the fifth connector is connected to the connection line.

13. The computer system of claim 12, wherein the main keyboard further comprises a sixth connector, the connection line is connected to the main keyboard by the sixth connector.

14. The computer system of claim 12, wherein the first and second connectors are female universal serial bus (USB) connectors, and the third and fourth connectors are male USB connectors.

15. The computer system of claim 14, wherein the numeric keyboard defines two receiving holes in the two side surfaces for receiving the corresponding third and fourth connectors, two depressed portions are defined in a bottom of the numeric keyboard corresponding to the receiving holes, a sliding grooves is defined in the bottom of each of the depressed portions and communicates with the corresponding receiving hole; wherein the numeric keyboard further comprises two operation members, each operation member comprises an operation portion and a connecting post extending from the operation portion; wherein the connecting post is passed through a corresponding sliding groove and fixed to one of the third or fourth connectors.

16. The computer system of claim 12, wherein the first and second connectors are male universal serial bus (USB) connectors, and the third and fourth connectors are female USB connectors.

17. The computer system of claim 16, wherein the main keyboard defines two receiving holes in the two end surfaces thereof for receiving the corresponding first and second connectors, two depressed portions are defined in a bottom of the main keyboard corresponding to the receiving holes, a sliding groove is defined in the bottom of each of the depressed portions and communicates with the corresponding receiving hole; wherein the main keyboard further comprises two operation members, each operation member comprises an operation portion and a connecting post extending from the operation portion; wherein the connecting post is passed through a corresponding sliding groove and fixed to one of the first or second connectors.

* * * * *